(12) United States Patent
Marine et al.

(10) Patent No.: US 7,168,462 B1
(45) Date of Patent: Jan. 30, 2007

(54) PNEUMATIC GREASING SYSTEM

(76) Inventors: Efi Marine, 50 Granite St., Rockland, ME (US) 04841; Richard J. LaLond, 39 Woodman Cir., Weymough, MA (US) 02190

( * ) Notice: Subject to any disclaimer, the term of this patent is extended or adjusted under 35 U.S.C. 154(b) by 273 days.

(21) Appl. No.: 10/863,767

(22) Filed: Jun. 8, 2004

(51) Int. Cl.
  *B65B 1/04* (2006.01)
(52) U.S. Cl. .......................... 141/27; 141/67; 141/234; 141/236; 141/238; 184/14
(58) Field of Classification Search .................. 141/18, 141/21, 25–27, 67, 234–238; 184/1.5, 14, 184/26; 222/262, 389
  See application file for complete search history.

(56) References Cited

U.S. PATENT DOCUMENTS

| | | | |
|---|---|---|---|
| 2,012,923 A * | 8/1935 | Bystricky | .................... 222/262 |
| 2,039,511 A | 5/1936 | Bailey | |
| 2,134,697 A | 11/1938 | Bijur | |
| 2,626,016 A | 1/1953 | Kiefer | |
| 2,772,029 A * | 11/1956 | De Lucia | .................... 222/179 |
| D213,515 S | 3/1969 | Yon, Jr. | |
| 3,527,322 A | 9/1970 | Roberts | |
| 5,285,871 A * | 2/1994 | Sievenpiper | ................ 184/7.4 |
| 5,482,138 A | 1/1996 | Mori et al. | |

FOREIGN PATENT DOCUMENTS

FR    2552056 A1 *  3/1985

* cited by examiner

*Primary Examiner*—Timothy L. Maust

(57) ABSTRACT

The pneumatic greasing system is a grease delivery system specially designed to accommodate the standard commercial grease cartridges already on the market. In order to accomplish this the present invention comprises a cylindrical barrel comprising a cylindrical chute shaped to receive common cartridges. Either end of said barrel is attached to funnel shaped members that in turn have outlets. Inserted within said barrel is a circular disc comprising a rubber O-ring attached to its circumference. In one embodiment the grease is driven from the barrel by pressurized air impacting said disc. In a second embodiment the grease is driven from the barrel by suction applied by a pump against the surface of said disc.

8 Claims, 3 Drawing Sheets

PNEUMATIC GREASING SYSTEM

BACKGROUND OF THE INVENTION

1. Field of the Invention

The present invention relates to pneumatic greasing system that uses outside air pressure machinery or an internal pump to transport grease from a storage cartridge to multiple sites that require greasing. This system can be incorporated as a permanent fixture or a mobile unit.

2. Description of the Prior Art

Many types of large machinery have numerous parts that require constant regreasing. A regular greasing is a standard maintenance requirement for everything from semi-trucks to steamboat engines. In particular the current methods of regreasing for large industrial trucks is extremely cumbersome. Typically a grease gun is used. This requires an individual to crawl under the truck and individually grease each required part. Most of these parts are provided with ports for greasing. A nipple to these ports connects the spout of the grease gun and the gun applies pressure to a cartridge that contains grease. The grease is squeezed out of the gun and into the part needing greasing. This maintenance should be done as frequently as once a week. However since this is such a dirty and difficult task using the existing method, many trucks are not greased until the oil is changed if that often. In addition, as with all maintenance work with heavy machinery a level of risk accompanies this job as it is currently done.

Since large trucks have numerous sites that should be regreased frequently in order to prolong their longevity it would be a great economic benefit to the trucking industry if a device could use preexisting machinery on the truck or an inexpensive pumping mechanism to store grease and deliver the grease to the desired ports by activating the system. A system such as this would eliminate the current difficulties that lead to inadequate truck maintenance and save a substantial amount of money in the long run.

The devices in the prior art that are designed for lubricating multiple sites using an automated system are either designed for particular machinery or require complicated and thus expensive delivery mechanisms. The present invention is suitable for use with many kinds of machinery. The first version can be used in conjunction with an air pressuring device either preexisting in the machinery or ancillary to the equipment. Another version uses a simple pumping mechanism that allows the present invention to be highly mobile and thus useful with many types of machinery.

U.S. Pat. No. 2,039,511 to A. R. Bailey discloses a lubricator designed for locomotives. This device uses the pressurized steam of the engine to drive the lubricant in its delivery process. This delivery system is distinct from the present invention that uses pressurized air in one embodiment and a pumping mechanism in the other. In addition the present invention is designed to use grease that is stored in a cartridge container such as already exist for grease guns. This makes the present invention suited for a preexisting product that makes the marketing and storage of grease convenient to both the supplier and the consumer. Furthermore the use of pressurized air makes the present invention particularly suited to large trucks since they typically are already outfitted with an air compressor system.

U.S. Pat. No. 2,134,697 to Joseph Bijur is a lubricating installation particularly suited for a motor vehicle chassis. This design like one embodiment of the present invention uses a pneumatic driving mechanism for delivering the lubricant. The Bijur '697 patent however discloses a system for delivering oil from a central reservoir to several substations where the oil is allowed to drip onto the bearing requiring lubrication. This system is particularly designed for working with the highly fluid oil that is used for lubricating the bearings of an automobile. It would not however be suited to the much more viscous nature of the grease that is needed in heavier machinery. Furthermore it would not provide a means for using grease cartridges and delivering the grease from these cartridges to the desired locations.

U.S. Pat. No. 2,626,016 to William C. Kiefer is a lubricating system designed for chain operations particularly those used in cooking devices. Like the Bijur '697 patent the Kiefer '016 patent is designed for a more fluid lubricant then that for which the present invention is designed. The system here described maintains a steady flow of lubricant in a central reservoir from which the lubricant may be delivered to the machinery by dripping due to gravity. This differs from the present invention that is entirely driven by air pressure. This completely pressurized design is particularly suited to the viscous grease commonly stored in grease cartridges.

U.S. Pat. No. 3,527,322 to Robert D. Roberts is for a control and monitoring system for a lubrication distributor. This patent does not disclose the mechanical means for delivering said lubricant but rather a means for monitoring and controlling rate of flow. This function is distinctly separate from the delivery function of the present invention.

U.S. Pat. No. 5,482,138 to Mori et al. is for an automatic greasing system that is in combination with a detector method. This detection method regulates the timing of greasing and the amount of grease required. This highly precise design is necessary for only certain machinery and in particular would not be necessary on large trucks. It would greatly increase the cost making it less desirable to he consumer if such sensitivity is not needed. In addition the design does not accommodate the delivery of grease from a grease cartridge such as are used with common grease guns. The delivery system relies on a pump that drives grease stored in a tank towards the desired destinations. No air-pressurized delivery system is described in the Mori et al. '138 patent.

U.S. Pat. Des. 213,515 to James H. Yon, Jr. is a design patent for an automatic lubrication system for knitting machines. This design does not disclose a method for using common commercial grease cartridges. The disclosure of this patent is limited to the exterior design of a housing that is in turn connected to a distributing block. This housing departs substantially from the manifold design of the present invention.

While the above-described devices fulfill their respective, particular objectives and requirements, the aforementioned patents do not describe a pneumatic greasing system that allows for a single unit that can be either mobile or stationary and can deliver grease from grease cartridges readily available on the current market to the necessary locations of modern day machinery.

Therefore a need exists for a new and improved pneumatic greasing system that can be used for a wide variety of machinery, delivers grease stored in common grease cartridges, and can be used with any air driving or pumping device. In this respect, the pneumatic greasing system according to the present invention substantially departs from the conventional concepts and designs of the prior art, and in doing so provides an apparatus primarily developed for the purpose of delivering grease from grease cartridges to machinery.

SUMMARY OF THE INVENTION

In view of the foregoing disadvantages inherent in the known types of lubricating devices now present in the prior art, the present invention provides an improved pneumatic greasing system, and overcomes the abovementioned disadvantages and drawbacks of the prior art. As such, the general purpose of the present invention, which will be described subsequently in greater detail, is to provide a new and improved pneumatic greasing system which has all of the advantages of the prior art mentioned heretofore and many novel features that result in a pneumatic greasing system which is not anticipated, rendered obvious, suggested, or even implied by the prior art, either alone or in combination thereof.

To attain this, the present invention essentially comprises a barrel shaped canister, the ends of which is removable and comprise an inlet mouth and an outlet mouth. The interior of the canister is a chute in which may be placed the standard commercial grease cartridge. A metal diaphragm surrounded by a rubber O-ring is placed within said chute and adjacent to the base of said grease cartridge. A source of pressurized air is connected to said inlet mouth. Said outlet mouth is connected to a distribution substation comprising an inlet and a plurality of outlets.

There has been outlined, rather broadly, the more important features of the invention in order that the detailed description thereof that follows may be better understood and in order that the present contribution to the art may be better appreciated.

The invention may instead of being attached to said pressurized air supply may have a pump connected to said outlet mouth. Said pump will draw said grease from said canister through said outlet mouth and deliver said grease to said substation.

Another feature that would exist is an air release valve connected to said inlet mouth of said canister allowing the user to manually redirect said pressurized air to an alternate location.

Also attached to the above-described outlets of the substation is a valve that comprises a threaded connector that may be attached to said outlets. The valves further comprise a control handle whereby the flow out of said sub housing into the outlets may be shut off.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pneumatic greasing system that has all of the advantages of the prior art and none of the disadvantages.

It is another object of the present invention to provide a new and improved pneumatic greasing system that may be easily and efficiently manufactured and marketed.

An even further object of the present invention is to provide a new and improved pneumatic greasing system that has a low cost of manufacture with regard to both materials and labor, and which accordingly is then susceptible of low prices of sale to the consuming public, thereby making such adjustable blind holders economically available to the buying public.

Still another object of the present invention is to provide a new pneumatic greasing system that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
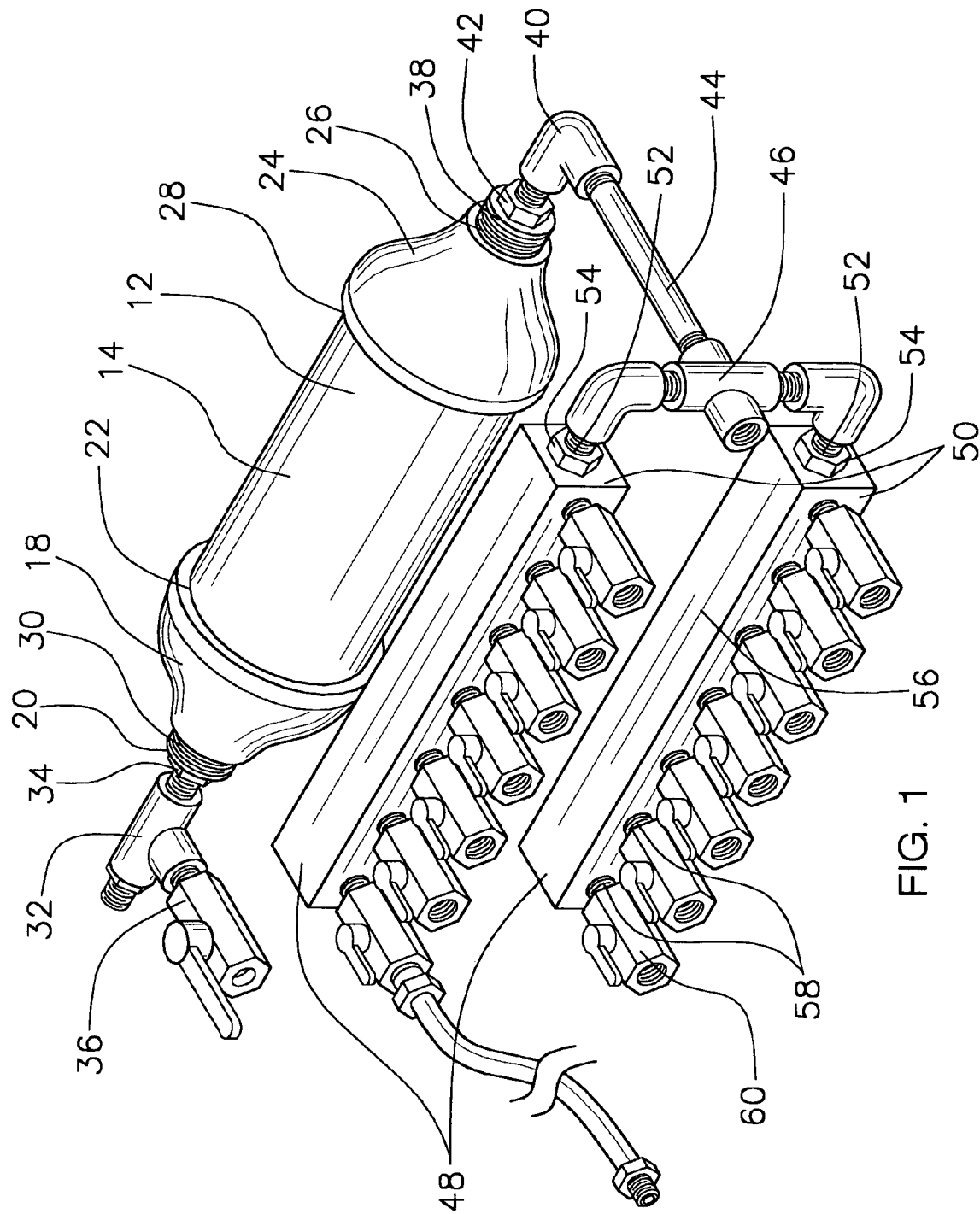
FIG. 1 is a top perspective view of the preferred embodiment of the pneumatic greasing system of the present invention where a source of pressurized air is used.

Referring now to the drawings, and particularly to FIGS. 1–4, a preferred embodiment of the pneumatic greasing system of the present invention is shown and generally designated by the reference numeral 10.

In FIG. 1, a front perspective view of a new and improved pneumatic greasing system 10 of the present invention for delivering grease from a grease cartridge to machinery is illustrated and will be described. Shown is a cylindrical canister 12.

Said canister 12 comprises a barrel 14 comprising a first threaded open end 16 and a second threaded open end.

Said canister 12 also comprises a first funnel shaped member 18 comprising a inlet mouth 20 and a wider outlet mouth 22 wherein said outlet mouth of said first funnel shaped member is attached to said first threaded open end 16 of said barrel 14. Said canister 12 further comprises a second funnel shaped member 24 comprising a outlet mouth 26 and a wider inlet mouth 28 wherein said inlet mouth is attached to said second threaded open end 16 of said barrel 14.

Also shown in FIG. 1 is a first connector 30 comprising a first end wherein said first end comprises a threaded exterior. Said first connector 30 also comprises an internally threaded second end. Said first end is connected to said inlet mouth 20 of said first funnel shaped member 18. The present invention comprises a T-shaped pipe 32 comprising an air inlet and a first and a second air outlet wherein said second end of said first connector 30 is attached to said first air outlet. The exterior of said second end of said first connector 30 comprises a nut shaped surface 34 for manipulation by standard wrenches in order to facilitate threading of said first connector 30. A source of pressurized air such as an air compressor may be connected to said air inlet of said T-shaped pipe 32. Also pictured in FIG. 1 is a valve 36 comprising an inlet and an outlet wherein said inlet of said valve is attached to said second outlet of said T-shaped pipe 32. Said valve 36 comprises a handle whereby the flow of air may be opened or shut off according to the user's wishes. It may in addition include a release mechanism that will automatically release air through said outlet of said valve 36 when a certain level of pressure in said T-shaped pipe 32 is exceeded.

In FIG. 1 the air-pressurized design for the present invention for receiving grease from said canister 12 is illustrated. A second connector 38 is shown comprising a first end wherein said first end comprises a threaded exterior. Said second connector 38 also comprises an internally threaded second end. Said first end is connected to said outlet mouth 26 of said second funnel shaped member 24. An L-shaped pipe 40 comprises an inlet end and an outlet end. Said inlet end of said L-shaped pipe 40 is connected to said second end of said connector 38. The exterior of said second end of said second connector 38 comprises a nut shaped surface 42 for manipulation by standard wrenches in order to facilitate threading of said second connector 38. Said L-shaped pipe 40 is in turn attached to a extension pipe 44 which is in turn connected to a cross-pipe 46 comprising an inlet and a first, a second and a third outlet. Said extension pipe 44 is attached to a said inlet of said cross-pipe 46. Said first outlet of said cross pipe 46 is sealed.

Further illustrated in FIG. 1 is a pair of manifold grease distributing substations 48 that are instrumental in the delivery of said grease to multiple locations. Said manifolds 48 comprise a rectangular housing 50. Said housing 50 comprises an inlet hole 52 attached to one of said outlets of said cross-pipe 46. Surrounding said inlet hole 52 a manifold nut 54 is mounted whereby a wrench may be used to rotated said manifold 48 in order to connect said inlet 52 to the threaded end of said cross-piped outlet 46. Said housing 50 comprises a chute 56 into which grease is drawn via said inlet hole 52. Said housing 50 furthermore comprises a plurality of outlet holes 58 that access said chute 56. Said holes 58 are threaded. The present invention comprises a plurality of shut-off manifold valves 60 attached by a threaded inlet end to said threaded outlet holes 58. Said valves comprise a handle whereby the user can control the flow of grease through said valve 60. Said valves 60 also comprise an outlet end that is threaded. FIG. 1 illustrates one of said outlet ends of said manifold valves 60 attached to a nut connector of a hose. Said hose may then be connected to the desired destination of said grease to complete the conduit.

Figure 2:
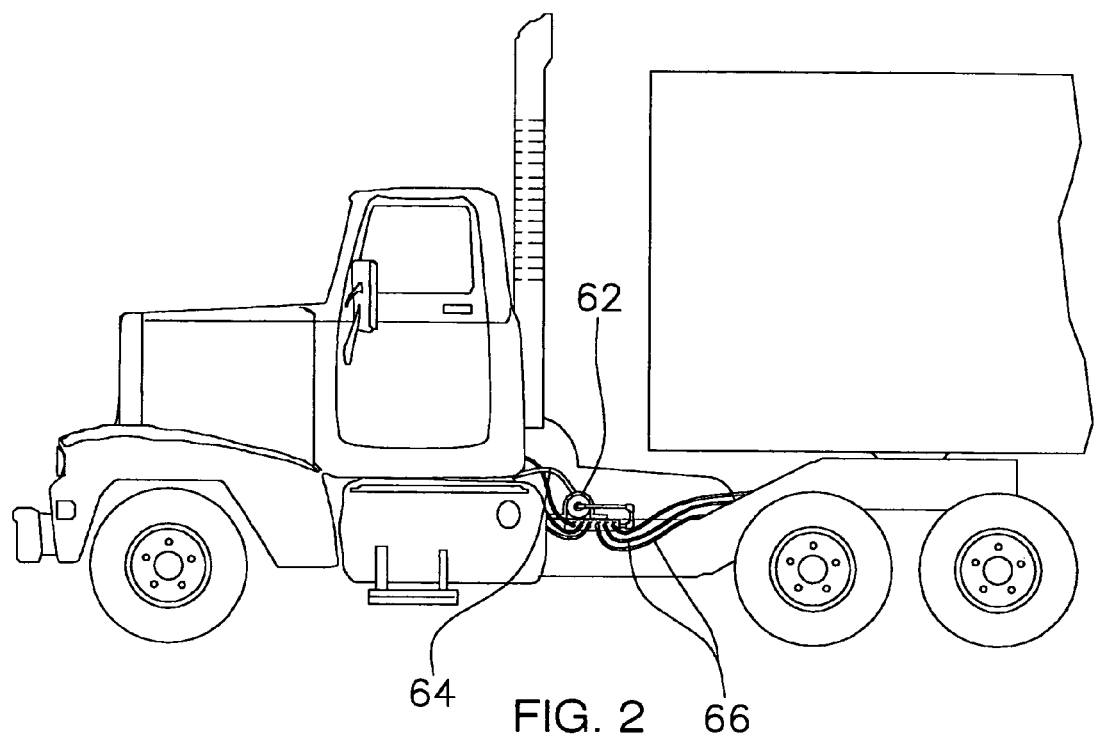
FIG. 2 is a side view of the pneumatic greasing system mounted on a truck.

In FIG. 2, a side view of the pneumatic greasing system mounted on a truck is shown. The above-described configuration in FIG. 1 may be altered to suit any particular need. The piping may be replaced with other shapes if that would be preferred. The configuration of the present invention in FIG. 2 is substantially the same as that of FIG. 1 except said outlet holes 58 are mounted on a different side of said housing 50. A bracket 62 may be mounted to a platform behind the cab of said truck by bolts or other attachment means. Said bracket 62 will enclose said canister 12 and hold it in place. The piping from said canister 12 to said manifold 48 is configured so that said manifold is suspended by said piping along the side of said platform. A T-connection may be employed in said piping to access a second manifold located on the opposite side of said platform.

Also illustrated in FIG. 2 is a connection arrangement that makes the present invention particularly suited to large trucks. Since most cabs of large trucks are equipped with a source of pressurized air, said source is connected by an air hose 64 to said inlet mouth 20 of said first funnel-shaped member 18. Several grease hoses 66 are attached to said outlet ends of said manifold valves 60. Said grease hoses 66 are then connected to the various grease ports commonly provided on trucks for lubrication. Said hoses may be permanently attached or may be connected as needed. The flow to a particular port may be cutoff if it is not ready for regreasing.

Figure 3:
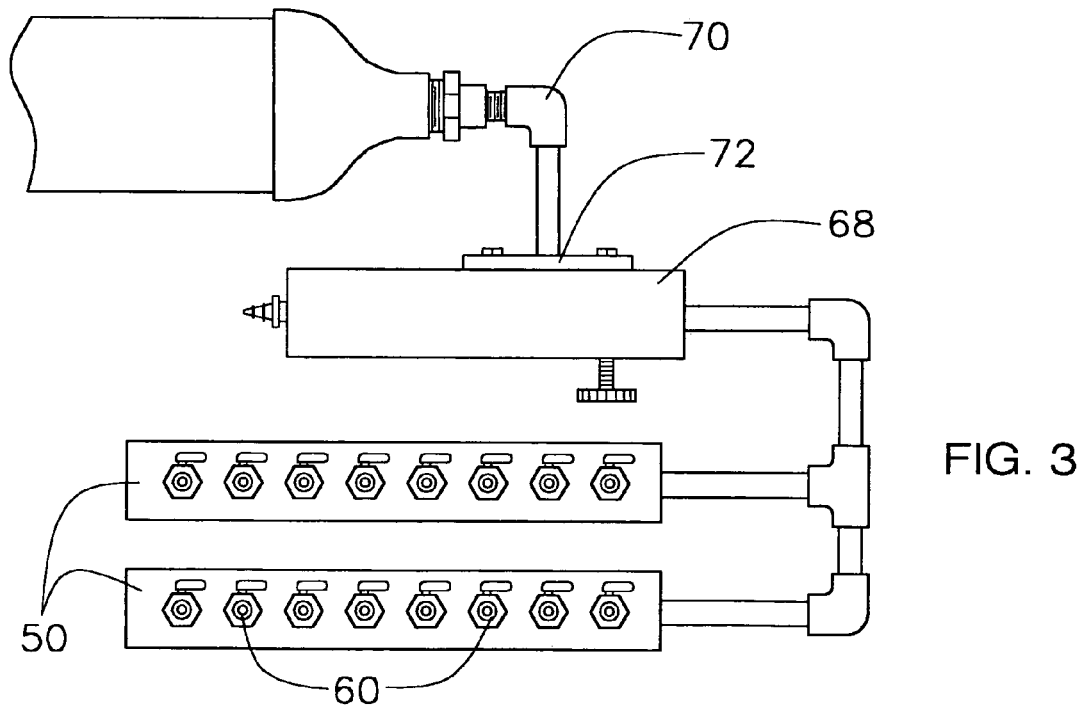
FIG. 3 is a side view of the pneumatic greasing system of the present invention where a pump is used.

In FIG. 3 an alternative embodiment of the present invention is illustrated. In this embodiment the grease in said canister 12 is delivered by a different mechanism. While in the first embodiment the grease is driven out of said canister 12 into said manifold 48 by air pressure driving the flow of said grease, the embodiment of FIG. 3 employs a pump 68 which creates suction at said outlet mouth 26 of said second funnel shaped member 24 so as to pull said grease out of said canister 12. Said pump 68 then propels said grease through a piping arrangement into said manifolds 48. In the illustrated arrangement said pump 68 is attached to said canister 12 by a L-shaped pipe 70 comprising a first end attached to said second connector 38 and a second end. Said second end is connected to a pipe which is connected to said pump 68 and is mounted to said pump by a platform 72 attached to said second end that comprises holes to receive bolts that attach to the surface of said pump 68. Also illustrated in the figure is an air inlet attached to said pump 68 and a control handle mounted on said pump. Said pump 68 is attached by piping to a plurality of said manifolds 48.

Figure 4:
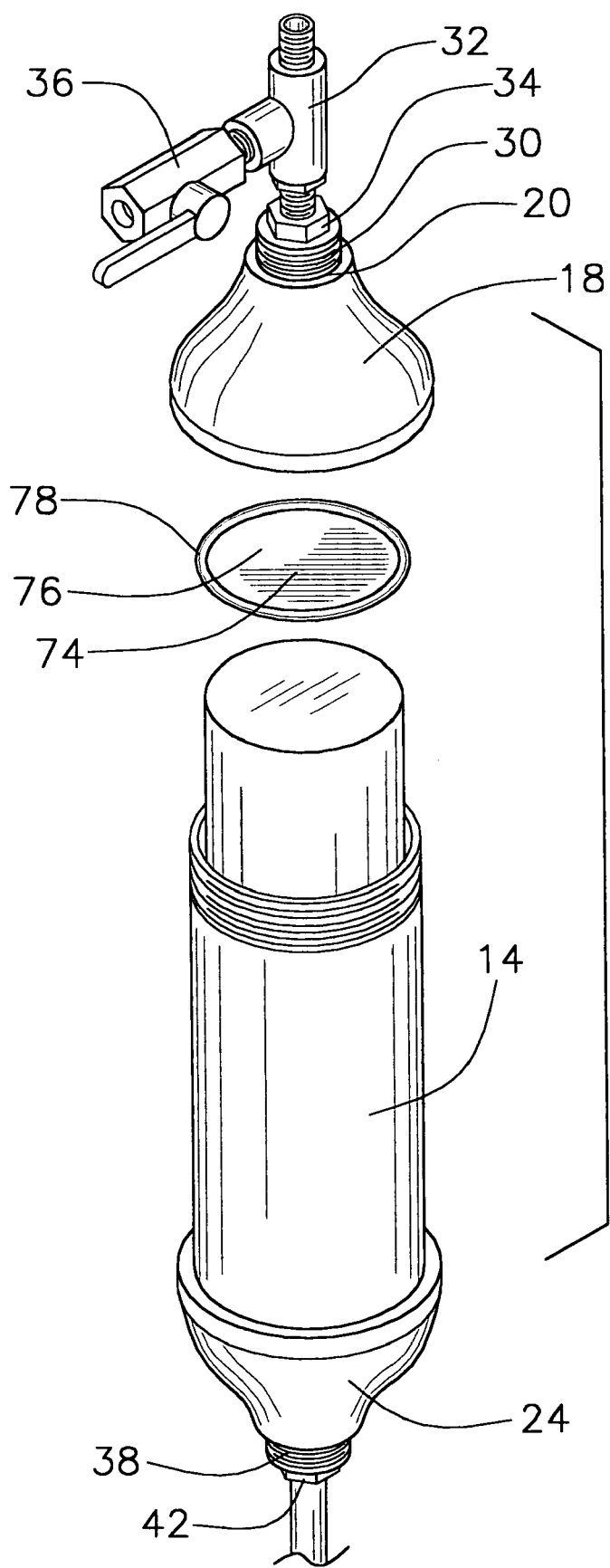
FIG. 4 is a side perspective view of the pneumatic greasing system of the present invention illustrating the installation of a standard commercial grease cartridge, or may be fitted to a specially manufactured cartridge.

In FIG. 4 said canister 12 is illustrated in dismantled form. Included in this diagram is a grease pressing disc 74. Said disc comprises a circular metal diaphragm 76 and a rubber O-ring 78 attached to the circumference of said diaphragm. Also shown is grease cartridge 80. The common design of a grease cartridge 80 is a cylindrical barrel comprising two open ends. The inside of said barrel is packed with grease. Each end is sealed with a removable lid. In installation one of said lids is removed and said metal disc 74 is placed adjacent to said grease at said end. The lid of the opposite end is then removed and said cartridge 80 is inserted into said barrel of said canister 12. Said first funnel-shaped member 18 is then attached to said barrel 14. When said source of pressurized air is activated the air is forced into said first funnel shaped member 18 and creates force as it impacts said diaphragm of said grease pressing disc 74. Said force causes said grease-pressing disc 74 to apply pressure to the surface of said grease that is in turn forced out of said cartridge 80. Said grease is then forced through said outlet mouth 26 of said second funnel-shaped member 24 so that said grease then flows to said manifolds. Alternatively said grease may be pulled by a pump rather then driven by a source of pressurized air. Said pump would be connected to said outlet mouth 26 of said second funnel-shaped member 24. Said pump will create a vacuum at said outlet mouth of said second funnel-shaped member that will create suction against said grease pressing disc 74. The suction of said grease pressing disc 74 activates pressure by the surface of said disc against the surface of said grease. Said pressure causes said grease to be forced through said outlet mouth of said second funnel-shaped member 24 and into said pump. Said pump then supplies pressure to said grease to drive it into said manifolds 48.

While a preferred embodiment of the pneumatic greasing system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention. For example, any suitable sturdy material may be used instead of the metal that has been described. And although the greasing of large trucks has been described, there are slight variations that would make the invention appropriate for a wide variety of machinery. In addition alternate driving mechanisms may be employed to transport said grease.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pneumatic greasing system comprising:
   a first funnel shaped member comprising an inlet mouth and a wider outlet mouth wherein said inlet mouth is connected to a supply of pressurized air;
   a barrel comprising a first and a second end wherein said first end is removably attached to said outlet mouth of said first funneled shaped member and wherein said barrel further comprises a cylindrical chute having a diameter and length equal to common commercial grease canisters;
   a second funnel shaped member comprising an outlet mouth and a wider inlet mouth wherein said wider inlet mouth is removably attached to said second end of said barrel;
   a circular disc inserted within said chute of said barrel wherein the center of said disc is axial to the axis of said cylindrical chute; and
   a cutoff valve connected to said inlet mouth of said first funnel-shaped member.

2. A pneumatic greasing system comprising:
   a first funnel shaped member comprising an inlet mouth and a wider outlet mouth wherein said inlet mouth is connected to a supply of pressurized air;
   a barrel comprising a first and a second end wherein said first end is removably attached to said outlet mouth of said first funneled shaped member and wherein said barrel further comprises a cylindrical chute having a diameter and length equal to common commercial grease canisters;
   a second funnel shaped member comprising an outlet mouth and a wider inlet mouth wherein said wider inlet mouth is removably attached to said second end of said barrel;
   a circular disc inserted within said chute of said barrel wherein the center of said disc is axial to the axis of said cylindrical chute; and
   a T-shaped pipe comprising an inlet, a first outlet, and a second outlet wherein said inlet is connected to said pressurized air supply, said first outlet is connected to said inlet mouth of said first funnel shaped member and said second outlet is connected to a cutoff valve.

3. A pneumatic greasing system comprising:
   a first funnel shaped member comprising an inlet mouth and a wider outlet mouth wherein said inlet mouth is connected to a supply of pressurized air;
   a barrel comprising a first and a second end wherein said first end is removably attached to said outlet mouth of said first funneled shaped member and wherein said barrel further comprises a cylindrical chute having a diameter and length equal to common commercial grease canisters;
   a second funnel shaped member comprising an outlet mouth and a wider inlet mouth wherein said wider inlet mouth is removably attached to said second end of said barrel;
   a circular disc inserted within said chute of said barrel wherein the center of said disc is axial to the axis of said cylindrical chute; and
   a rectangular housing comprising an intake hole and an outlet hole wherein said intake hole is connected to said outlet mouth of said second funnel-shaped member.

4. A pneumatic greasing system comprising:
   a first funnel shaped member comprising an inlet mouth and a wider outlet mouth wherein said inlet mouth is connected to a supply of pressurized air;
   a barrel comprising a first and a second end wherein said first end is removably attached to said outlet mouth of said first funneled shaped member and wherein said barrel further comprises a cylindrical chute having a diameter and length equal to common commercial grease canisters;
   a second funnel shaped member comprising an outlet mouth and a wider inlet mouth wherein said wider inlet mouth is removably attached to said second end of said barrel;
   a circular disc inserted within said chute of said barrel wherein the center of said disc is axial to the axis of said cylindrical chute; and
   a multi-armed pipe comprising an inlet and multiple outlets wherein said inlet is connected to said outlet mouth of said second funnel-shaped member.

5. A pneumatic greasing system comprising:
   a first funnel shaped member comprising an inlet mouth and a wider outlet mouth wherein said inlet mouth is connected to a supply of pressurized air;
   a barrel comprising a first and a second end wherein said first end is removably attached to said outlet mouth of said first funneled shaped member and wherein said barrel further comprises a cylindrical chute having a diameter and length equal to common commercial grease canisters;

a second funnel shaped member comprising an outlet mouth and a wider inlet mouth wherein said wider inlet mouth is removably attached to said second end of said barrel;

a circular disc inserted within said chute of said barrel wherein the center of said disc is axial to the axis of said cylindrical chute; and a rectangular housing comprising an intake hole and an outlet hole wherein said intake hole is connected to said outlet pipe of said pump.

6. A pneumatic greasing system comprising:

a first funnel shaped member comprising an inlet mouth and a wider outlet mouth wherein said inlet mouth is connected to a supply of pressurized air;

a barrel comprising a first and a second end wherein said first end is removably attached to said outlet mouth of said first funneled shaped member and wherein said barrel further comprises a cylindrical chute having a diameter and length equal to common commercial grease canisters;

a second funnel shaped member comprising an outlet mouth and a wider inlet mouth wherein said wider inlet mouth is removably attached to said second end of said barrel;

a circular disc inserted within said chute of said barrel wherein the center of said disc is axial to the axis of said cylindrical chute; and a cutoff valve connected to an outlet pipe of said pump.

7. A pneumatic greasing system comprising:

a first funnel shaped member comprising an inlet mouth and a wider outlet mouth wherein said inlet mouth is connected to a supply of pressurized air;

a barrel comprising a first and a second end wherein said first end is removably attached to said outlet mouth of said first funneled shaped member and wherein said barrel further comprises a cylindrical chute having a diameter and length equal to common commercial grease canisters;

a second funnel shaped member comprising an outlet mouth and a wider inlet mouth wherein said wider inlet mouth is removably attached to said second end of said barrel;

a circular disc inserted within said chute of said barrel wherein the center of said disc is axial to the axis of said cylindrical chute; and a multi-armed pipe comprising an inlet and multiple outlets wherein said inlet is connected to said outlet pipe of said pump.

8. A pneumatic greasing system comprising:

a first funnel shaped member comprising an inlet mouth and a wider outlet mouth wherein said inlet mouth is connected to a supply of pressurized air;

a barrel comprising a first and a second end wherein said first end is removably attached to said outlet mouth of said first funneled shaped member and wherein said barrel further comprises a cylindrical chute having a diameter and length equal to common commercial grease canisters, a second funnel shaped member comprising an outlet mouth and a wider inlet mouth wherein said wider inlet mouth is removably attached to said second end of said barrel;

a circular disc inserted within said chute of said barrel wherein the center of said disc is axial to the axis of said cylindrical chute; and a bracket overlapping said barrel and comprising a plurality of holes for receiving fasteners.

\* \* \* \* \*